(12) United States Patent
Kim-Perek (10) Patent No.: US 10,926,680 B2
(45) Date of Patent: Feb. 23, 2021

(54) EASY WASH CAR SEAT COVER

(71) Applicant: Jinah Kim-Perek, Simi Valley, CA (US)

(72) Inventor: Jinah Kim-Perek, Simi Valley, CA (US)

(73) Assignee: Jinah Kim-Perek, Simi Valley, CA (US)

( * ) Notice: Subject to any disclaimer, the term of this patent is extended or adjusted under 35 U.S.C. 154(b) by 276 days.

(21) Appl. No.: 15/817,040

(22) Filed: Nov. 17, 2017

(65) Prior Publication Data

US 2018/0147963 A1    May 31, 2018
US 2020/0130545 A9    Apr. 30, 2020

Related U.S. Application Data

(60) Provisional application No. 62/426,423, filed on Nov. 25, 2016.

(51) Int. Cl.

| | |
|---|---|
| *A47C 31/11* | (2006.01) |
| *B60N 2/60* | (2006.01) |
| *B60N 2/28* | (2006.01) |
| *B60N 3/10* | (2006.01) |
| *B65D 88/22* | (2006.01) |
| *B65D 88/54* | (2006.01) |
| *B65D 90/20* | (2006.01) |
| *B67D 7/02* | (2010.01) |
| *B60P 3/22* | (2006.01) |

(52) U.S. Cl.
CPC ............. *B60N 2/60* (2013.01); *B60N 2/2881* (2013.01); *B60N 2/6018* (2013.01); *B60N 2/6027* (2013.01); *B60N 2/6036* (2013.01); *B60N 2/6054* (2013.01); *B60N 3/10* (2013.01); *B65D 88/22* (2013.01); *B65D 88/54* (2013.01); *B65D 90/20* (2013.01); *B67D 7/0216* (2013.01); *B60N 2/28* (2013.01); *B60P 3/225* (2013.01); *B60P 3/2265* (2013.01)

(58) Field of Classification Search
CPC ................................ B60N 2/2881; B60N 2/60
See application file for complete search history.

(56) References Cited

U.S. PATENT DOCUMENTS

| | | | | |
|---|---|---|---|---|
| 4,695,092 A | * | 9/1987 | Hittie ..................... | B60N 2/60 297/181 |
| 4,810,030 A | * | 3/1989 | Lewis ..................... | A47C 7/66 135/96 |
| 4,891,454 A | * | 1/1990 | Perdelwitz, Jr. ..... | B60N 2/2812 297/219.12 |

(Continued)

*Primary Examiner* — Shin H Kim (57) ABSTRACT

An apparatus for a universal child car seat cover is provided for use with a child car seat. The child car seat cover comprises an absorbent material joined with a waterproof lining that covers the child car seat and receives a seated child. The absorbent material protects the child car seat from spills and contaminants, and covers any potentially dangerous or uncomfortable surfaces on the underlying child car seat. Seat belt openings may be closed around seat belts of the child car seat to prevent passage of spills onto the child car seat. A pocket permits an entirety of the child car seat cover to be rolled and tucked into the pocket. Cup holder openings provide access to cup holders of the child car seat. A drawstring within a peripheral channel may be cinched to fixate the child car seat cover on the child car seat.

1 Claim, 8 Drawing Sheets

(56) References Cited

U.S. PATENT DOCUMENTS

| | | | | |
|---|---|---|---|---|
| 5,967,606 A * | 10/1999 | Bergh | ............... | B62B 3/144 297/219.12 |
| 6,019,421 A * | 2/2000 | Roh | ............... | A47C 29/006 297/184.13 |
| 6,129,418 A * | 10/2000 | Bergh | ............... | B62B 3/144 297/219.12 |
| 6,142,565 A * | 11/2000 | Rieder | ............... | A47C 31/11 297/219.1 |
| 6,394,543 B1 * | 5/2002 | Dunne | ............... | B60N 2/2806 297/219.12 |
| 6,428,098 B1 * | 8/2002 | Allbaugh | ............... | A47D 1/00 297/219.12 |
| 6,851,749 B2 * | 2/2005 | Norman | ............... | A47D 1/10 297/219.12 |
| 7,192,086 B2 * | 3/2007 | Davis | ............... | A47C 7/66 297/184.13 |
| 7,677,661 B1 * | 3/2010 | Ferrari-Cicero | ............... | B60N 2/2812 297/219.12 |
| 7,695,066 B2 * | 4/2010 | Guercia | ............... | A47C 31/11 297/219.1 |
| 7,931,335 B1 * | 4/2011 | Siklosi | ............... | B60N 2/6027 297/219.1 |
| 8,042,869 B2 * | 10/2011 | McClintock | ............... | B62B 3/1448 297/219.12 |
| 8,256,651 B2 * | 9/2012 | Reynolds | ............... | B62B 3/144 224/275 |
| 8,770,663 B2 * | 7/2014 | Zack | ............... | A47C 31/11 297/181 |
| 10,173,707 B2 * | 1/2019 | Trumbo | ............... | B62B 5/069 |
| 2002/0125747 A1 * | 9/2002 | Drost | ............... | A41B 13/00 297/184.13 |
| 2005/0110315 A1 * | 5/2005 | Littlehorn | ............... | B60N 2/26 297/219.12 |
| 2006/0103195 A1 * | 5/2006 | Stanley | ............... | A47C 7/386 297/220 |
| 2006/0108842 A1 * | 5/2006 | Davis | ............... | A47C 7/66 297/184.13 |
| 2007/0085391 A1 * | 4/2007 | Pines | ............... | B60N 2/2881 297/219.12 |
| 2008/0150335 A1 * | 6/2008 | Pines | ............... | B60N 2/2881 297/219.12 |
| 2010/0237671 A1 * | 9/2010 | Danziger | ............... | B60N 2/2812 297/219.12 |
| 2011/0248532 A1 * | 10/2011 | Kim | ............... | A47C 7/748 297/180.11 |
| 2012/0286549 A1 * | 11/2012 | Fair | ............... | B62B 9/108 297/219.12 |
| 2013/0009433 A1 * | 1/2013 | Popovic | ............... | A47C 31/113 297/219.1 |
| 2016/0068088 A1 * | 3/2016 | Stevens-Poire' | ............... | B60N 2/58 297/228.1 |

* cited by examiner

EASY WASH CAR SEAT COVER

PRIORITY

This application claims the benefit of and priority to U.S. Provisional Application, entitled "EZ Wash Car Seat Cover," filed on Nov. 25, 2016 and having application Ser. No. 62/426,423.

FIELD

The field of the present disclosure generally relates to seat covers. More particularly, the field of the present disclosure relates to seat covers for infant or child car seats for use in vehicles.

BACKGROUND

Child car seats are utilized to transport infants and children safely in vehicles. There are many types, brands and styles of car seats yet all suffer from one common problem they are easily soiled by any of a wide range of contaminants associated with, generated by, or proximal to infants and children including food, drinks, bodily fluids and other messes.

Child car seats are particularly susceptible to such soiling because their function dictates a design which has a soft fabric covering which is frequently absorbent, and many interstitial spaces into which contaminants may fall and collect and be difficult to access for removal or cleaning. Further, the complex shape and structure of car seats and their reliance on proper assembly to protect a child creates additional obstacles and liabilities to the disassembly necessary to thoroughly clean the device.

Because many of the contaminants to which child car seats are frequently exposed are biologically active or themselves toxic or hazardous, it is imperative for the health and safety of the child utilizing the child car seat or any other children or adults who may come into contact with the child car seat that all contaminants be quickly and thoroughly removed and cleaned from the child car seat as soon as practicable after exposure and the child car seat returned to a sanitary and hygienic condition.

The most rudimentary solution to the problem of preventing soiling and contamination of a child car seat is the utilization of non-absorbent materials in the construction of the device. One area of deficiency generally present in this proposed solution to utilize non-absorbent materials in the construction of a child car seat to address the problem of preventing soiling and contamination is the physically unpleasant feel of these non-absorbent materials against the skin of the child utilizing the child car seat. Another area of deficiency generally present in this proposed solution to the problem of preventing soiling and contamination of a child car seat is that spills which might otherwise be absorbed by the child car seat run off of the child car seat and are absorbed by the child's clothing or the upholstery of the vehicle.

Another solution to the problem of preventing soiling and contamination of a child car seat is designing child car seats which may be removed from the vehicle and disassembled for cleaning. One area of deficiency generally present in this proposed solution to the problem of preventing soiling and contamination of a child car seat is the mechanical complexity of disassembling the child car seat which may intimidate or exceed the technical and mechanical capabilities of users, or may require tools which users do not own. Another area of deficiency generally present in this proposed solution to the problem of preventing soiling and contamination of a child car seat is the time required to disassemble, clean and reassemble a child car seat. Yet another area of deficiency generally present in this proposed solution to the problem of preventing soiling and contamination of a child car seat is the tremendous risk and liability of improperly reassembling the child car seat after it has been disassembled for cleaning due to the fact that proper assembly is critical to safe operation, thereby reducing its safety and effectiveness in protecting a child.

Still another area of deficiency generally present in this proposed solution to the problem of preventing soiling and contamination of a child car seat is loss of use of the child car seat while waiting for it to dry if water or other liquids were used to clean it. It is relevant to note that many components of child car seats must be allowed to air dry, since they cannot withstand the heat or friction of drying machines. Their unsuitability for placement in drying machines increases the length of time during which the car seat cannot be used.

Another common solution to the problem of preventing soiling and contamination of a child car seat is the utilization of fabric treatments or sprays which provide a protective barrier against liquids and contaminants which would otherwise penetrate the child car seat materials. However, this proposed solution to the prevention of soiling and contamination of a child car seat suffers from all of the same deficiencies as the use of non-absorbent materials.

Yet another common solution to the problem of preventing soiling and contamination of a child car seat is the use of a separate removable cover which protects the child car seat while in use, but which may be removed from the child car seat and the vehicle and easily cleaned or washed. One area of deficiency generally present in many known removable covers for child car seats is their relatively high cost. This high cost is a barrier to purchase, particularly if one wishes to purchase multiple covers as would be optimal for the intended use.

Another area of deficiency generally present in all known removable covers for child car seats is the complexity of design and complexity of installation onto and removal from a child car seat. Many such seats are elaborately tailored to follow every contour of the child car seat for which they are designed and it is time consuming and physically challenging to install and remove them.

Another area of deficiency generally present in many known removable covers for child car seats is that they are designed and tailored to fit only certain models of child car seats. This is disadvantageous for the end user who may have more than one child car seat, or in the event of a purchase of a new child car seat all such covers become obsolete. A further disadvantage is for the manufacturer or retailer who bears the burden of the necessity of producing and stocking a large number of stock keeping units in order to have covers available for a wide range of different child car seat models.

Another area of deficiency generally present in many known methods of protecting child car seats is that the protective covering blocks access to child car seat features such as cup holders, and prevents the child from placing objects such as food, drinks, or other potentially messy items in the cup holders. By blocking access to cup holders or storage compartments, the child is more apt to spill foods or liquids, or may lose other items such as small toys and keepsakes. As a result, car seat covers that block access to cup holders can contribute to the creation of additional messes or inconveniences for the child user and the parent.

While there are presently a number of proposed solutions to the problem of preventing soiling and contamination of a child car seat, none have been conceived or implemented to permit a hygienic, inexpensive, fast and easy to utilize, universal solution which does not require special tools or skills to implement, with the safety, convenience and functional features disclosed herein which would be optimal for the application.

SUMMARY

Child car seat removable protective covering means embodying the principles of this invention solve the problems of universal, hygienic, inexpensive, fast and easy to utilize means of preventing soiling and contamination of child car seats which may be quickly and easily removed and washed, which are inexpensive enough to facilitate the purchase of multiple units to permit rapid changes, and which do not require special tools or skills to implement, with the safety, convenience and functional features disclosed herein. The several embodiments of the invention employ designs, materials, and manufacturing methods which are inexpensive and consistent with current manufacturing practices. The functionality, size, cost, simplicity, ease of use, reliability and robustness of the proposed designs are all advantageous.

Implementations following the principles of this invention allow the advantageous modality of hygienic, inexpensive, fast and easy to utilize, universal child car seat covers which prevent soiling and contamination of child car seats which may be quickly and easily removed and washed, which are inexpensive enough to facilitate the purchase of multiple units to permit rapid changes, and which do not require special tools or skills to install or remove, with the safety, convenience and functional features disclosed herein, which would be optimal for the application.

In an exemplary embodiment, a child car seat cover for installation onto a child car seat comprises: an absorbent material that covers the child car seat and comprises a surface to receive a seated child; a peripheral edge of the absorbent material configured to fixate the child car seat cover on the child car seat; seat belt openings; one or more pockets; and one or more cup holder openings.

In another exemplary embodiment, the absorbent material is configured to fully cover and protect the child car seat from spills, stains, soiling, and other sources of contamination. In another exemplary embodiment, the absorbent material is configured to operate as a protective layer that covers any potentially dangerous or uncomfortable surfaces on the underlying child car seat.

In another exemplary embodiment, the seat belt openings include fasteners such that the seat belt opening may be closed around seat belts extending from the child car seat to prevent passage of spills or contaminants through seat belt openings onto the child car seat. In another exemplary embodiment, the one or more cup holder openings may be closed by way of any of snaps, hook and loop fasteners, buttons, hooks, zippers, and the like.

In another exemplary embodiment, the one or more pockets are sized and positioned on the child car seat cover so as to permit an entirety of the child car seat cover to be rolled and tucked into the one or more pockets. In another exemplary embodiment, the child car seat cover further comprises a belt fastener opening and a belt adjuster opening, each of the belt fastener opening and the belt adjuster opening being circumscribed with reinforcing fabric that is joined to the absorbent material. In another exemplary embodiment, the child car seat cover further comprises a waterproof lining that is joined to an underside of at least a portion of the absorbent material.

In another exemplary embodiment, the peripheral edge is comprised of a channel circumscribing the absorbent material and a drawstring extending through the channel. In another exemplary embodiment, the channel is comprised of a tubular space created by folding the peripheral edge over and securing onto the absorbent material. In another exemplary embodiment, a drawstring closure is disposed on the drawstring and configured to cinch the drawstring so as to reduce the circumference of the peripheral edge thereby fixating the child car seat cover on the child car seat. In another exemplary embodiment, the peripheral edge is comprised of any of elastic strips, snaps, zippers, hooks, and hook and loop closures placed at intervals along the peripheral edge and configured to reduce the circumference of the peripheral edge thereby fixating the child car seat cover on the child car seat. In another exemplary embodiment, opposite ends of elastic straps or cords are securely fastened to diametrically opposed locations of the peripheral edge, such that the straps or cords pull the opposed locations of the peripheral edge towards one another, thereby effectively cinching the peripheral edge and securing child car seat cover around child car seat.

In an exemplary embodiment, a child car seat cover for a child car seat comprises: an absorbent material joined with a waterproof lining that covers the child car seat and comprises a surface to receive a seated child; a channel extending along a peripheral edge of the absorbent material; a drawstring extending through the channel; and a drawstring closure configured to cinch the drawstring to reduce the circumference of the peripheral edge thereby fixating the child car seat cover on the child car seat.

In another exemplary embodiment, the child car seat cover further comprises: seat belt openings; one or more pockets; and one or more cup holder openings. In another exemplary embodiment, the one or more pockets are configured to receive an entirety of the child car seat cover to be rolled and tucked therein. In another exemplary embodiment, the seat belt openings are configured to provide access to seat belts extending from the child car seat. In another exemplary embodiment, the seat belt openings include fasteners that are configured to be closed around the seat belts to prevent passage of spills or contaminants through seat belt openings onto the child car seat.

In an exemplary embodiment, a child car seat cover for installation onto a child car seat comprises: an absorbent material that covers the child car seat and comprises a surface to receive a seated child; a circumscribing hem disposed along a peripheral edge of the absorbent material; seat belt openings; one or more pockets; and one or more cup holder openings.

In another exemplary embodiment, the peripheral edge is comprised of any of elastic strips, snaps, zippers, hooks, and hook and loop closures placed at intervals along the peripheral edge and configured to reduce the circumference of the peripheral edge so as to fixate the child car seat cover on the child car seat. In another exemplary embodiment, opposite ends of elastic straps or cords are securely fastened to diametrically opposed locations of the peripheral edge, such that the straps or cords pull the opposed locations of the peripheral edge towards one another, thereby cinching the peripheral edge and securing child car seat cover around child car seat.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first fastener," may be made. However, the specific numeric reference should not be interpreted as a literal sequential order but rather interpreted that the "first fastener" is different than a "second fastener." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present disclosure provides a child car seat cover for a child car seat. The child car seat cover comprises an absorbent material joined with a waterproof lining that covers the child car seat and comprises a surface to receive a seated child. The absorbent material is configured to fully cover and protect the child car seat from spills, stains, and soiling, as well as operate as a protective layer that covers any potentially dangerous or uncomfortable surfaces on the underlying child car seat. Seat belt openings are configured to be closed around seat belts extending from the child car seat so as to prevent passage of spills or contaminants onto the child car seat. At least one pocket is sized and positioned on the child car seat cover so as to permit an entirety of the child car seat cover to be rolled and tucked into the pocket. One or more cup holder openings are configured to provide access to one or more cup holders disposed on the child car seat. The one or more cup holder openings may be closed by way of any of snaps, hook and loop fasteners, buttons, hooks, zippers, and the like. A channel that houses a drawstring extends along a peripheral edge of the absorbent material. A drawstring closure is configured facilitate cinching the drawstring to reduce the circumference of the peripheral edge thereby fixating the child car seat cover on the child car seat.

Figure 1:
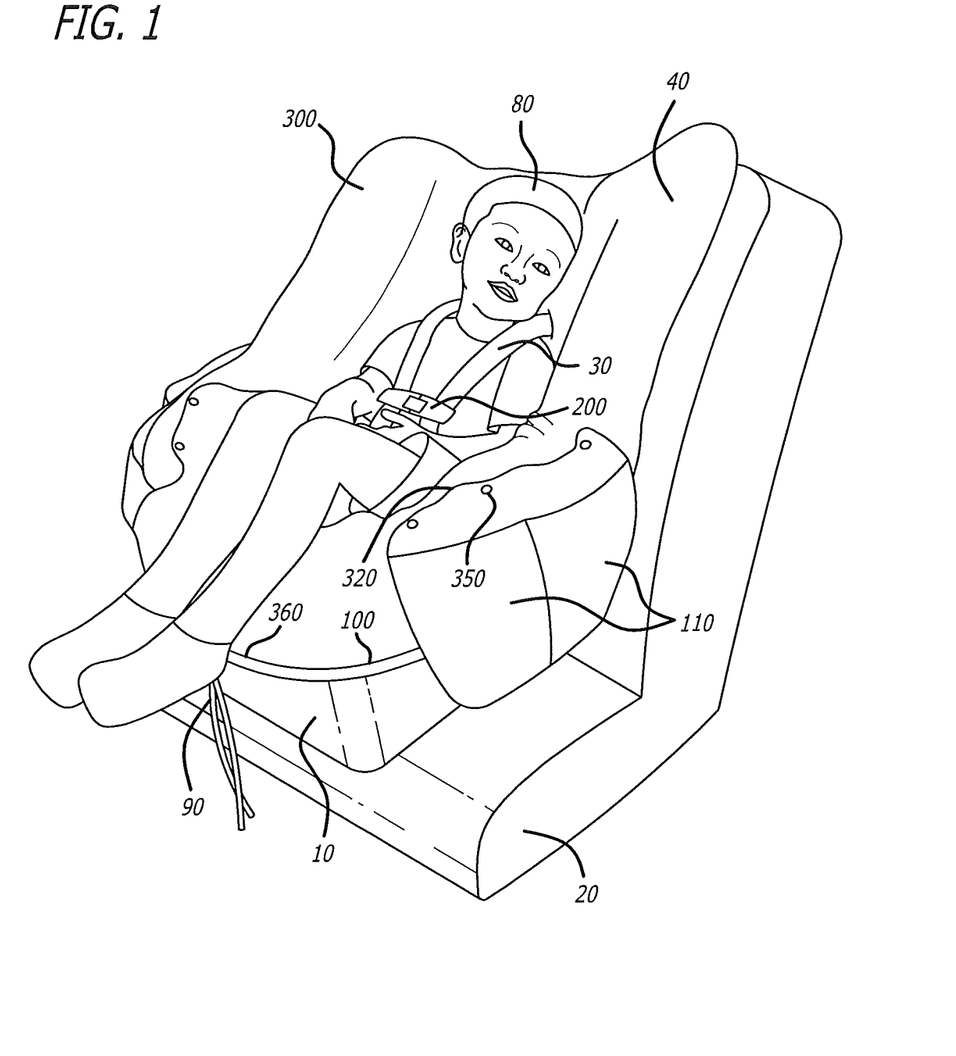
FIG. 1 shows a front perspective view of a child sitting on an exemplary embodiment of a child car seat cover installed on a typical child car seat and embodying teachings of the present disclosure.

FIG. 1 shows a front perspective view of a child 80 sitting on an exemplary embodiment of a child car seat cover 300 installed on a typical child car seat 10 that is secured in a vehicle. As shown in FIG. 1, the child 80 is strapped into the child car seat 10 by means of a seat belt 30 fastened to a belt fastener 200, but the child rests entirely upon an absorbent material 40 of the child car seat cover 300. The child car seat cover 300 fully covers and protects the child car seat 10 from spills, stains, soiling, and other sources of contamination. This protective covering protecting the underlying child car seat 10 is the first benefit of the child car seat cover 300 of the present invention.

Still referring to FIG. 1, it may be further seen how any exposed skin of child 80 contacts only the absorbent material 40 comprising the surface of child car seat cover 300 rather than plastic or metal components or non-absorbent materials comprising the child car seat 10 which might be cold, hot, hard, abrasive or uncomfortable. Thus, the child car seat cover 300 operates as a protective layer that covers any potentially dangerous or uncomfortable surfaces on the underlying child car seat 10 and is the second benefit of the child car seat cover 300 of the present invention.

Figure 2:
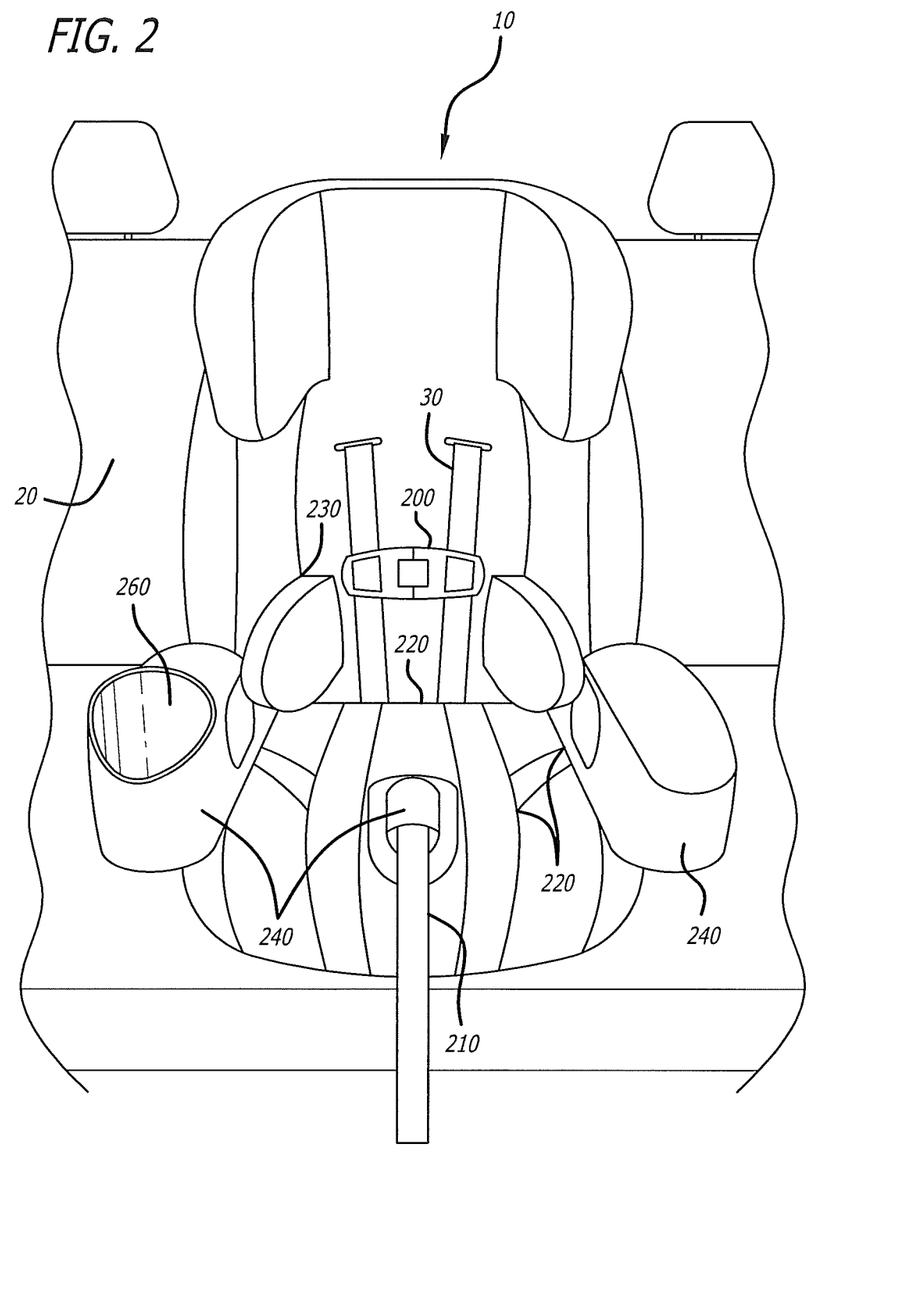
FIG. 2 shows a front perspective view of a typical child car seat in absence of a child car seat cover.

Referring now to FIG. 2, a front perspective view of a typical child car seat 10 is shown in absence of the child car seat cover 300. As shown in FIG. 2, multiple crevices 220 and interstitial spaces 230 are vulnerable to contamination from spills or environmental contaminants. As will be recognized, cleaning such crevices 220 and interstitial spaces 230 would be difficult without major disassembly of child car seat 10 or possibly the use of cleaning liquids which may require extended drying times, thereby rendering the child car seat 10 unusable for an extended period of time until dry subsequent to cleaning.

With continuing reference to FIG. 2, it may be plainly seen how plastic components 240 are exposed elements of the child car seat 10 that may easily contact the skin of child 80 when placed in child car seat 10. In the event that the vehicle has been parked for an extended period in very hot conditions it is possible that plastic components 240 may have become so hot as to cause great discomfort or possibly even injury to child 80 if the skin of child 80 comes into contact with plastic components 240 when placed into child car seat 10. Conversely, in extreme cold environments plastic components 240 may become uncomfortably or dangerously cold if inadvertent contact is made with the skin of child 80 when child 80 is placed into child car seat 10. The protective barrier function of child car seat cover 300 described above as the second benefit of the present invention is of even greater importance when potential injuries such as may result from contact between hot surfaces and the child 80's skin becomes even more important and valuable in this instance.

Still referring to FIG. 2, one may plainly see the seat belts 30 and belt adjuster 210 which are vital to the safe operation of child car seat 10 and which therefore easily pass through specifically provided openings in child car seat cover 300.

Figure 3:
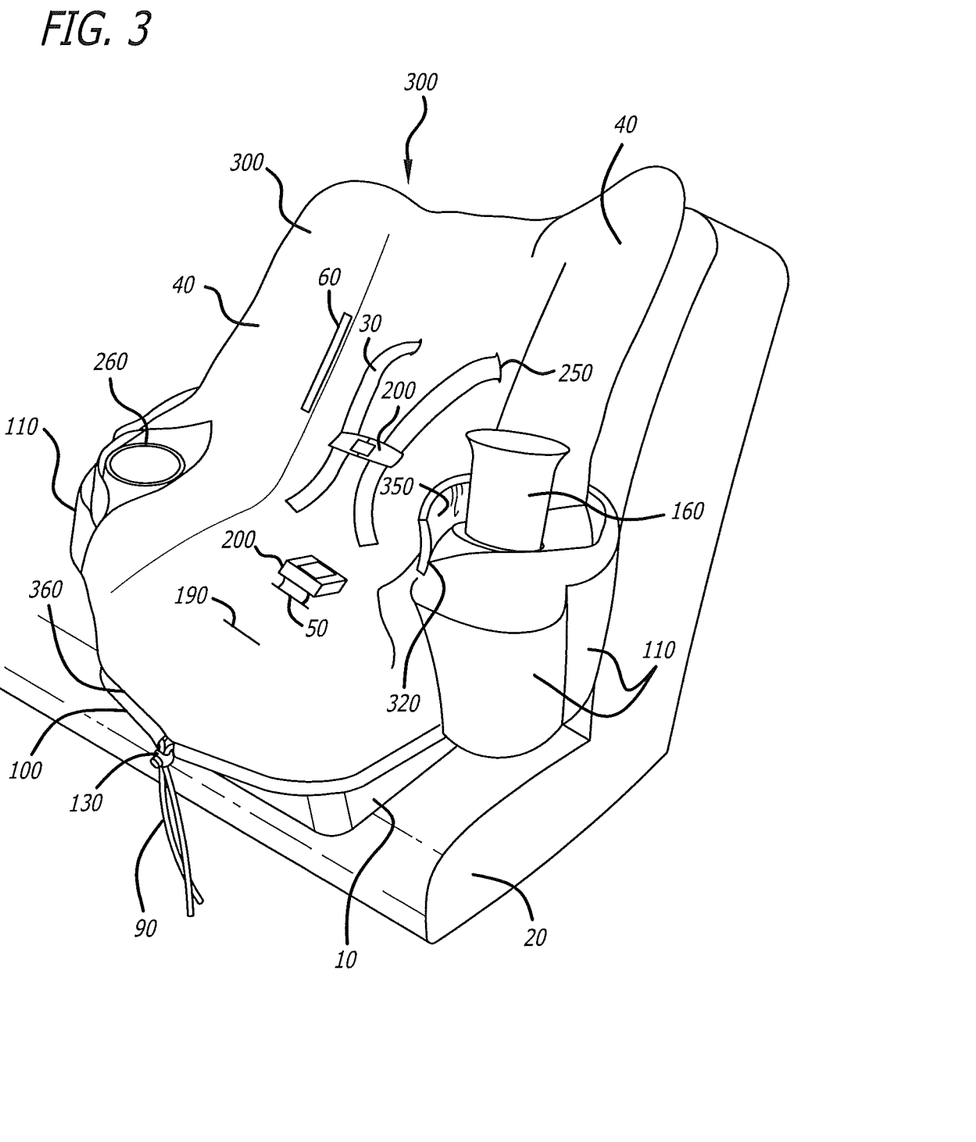
FIG. 3 shows a front perspective view of an exemplary embodiment of a child car seat cover installed on a typical child car seat and embodying teachings of the present disclosure.

FIG. 3 shows a front perspective view of one embodiment of a child car seat cover 300 installed on a typical child car seat 10 and embodying teachings of the present disclosure. Seat belts 30 protrude through seat belt openings 250, which, in order to facilitate fast and easy access to seat belts 30, are relatively large openings. Once seat belts 30 have been pulled through seat belt openings 250, seat belt openings 250 may be closed to prevent passage of spills or contaminants through seat belt openings 250 which might possibly soil or contaminate child car seat 10. In the illustrated embodiment hook and loop fastener 60, one mating half of which lines each opposing side of seat belt openings 250, may be utilized to selectively re-close seat belt opening 250 once seat belt 30 has been pulled through child car seat cover 300. In some embodiments, seat belt openings 250 may be closed around seat belts 30 by means of buttons, snaps, hooks, zippers or any of a variety of fastening means well known in the art. In one embodiment, elastic may be used to close seat belt opening 250 around seat belt 30 without the necessity of employing any fasteners. In one embodiment, seat belt openings 250 may be configured differently, in another shape, style or pattern.

Figure 3A:
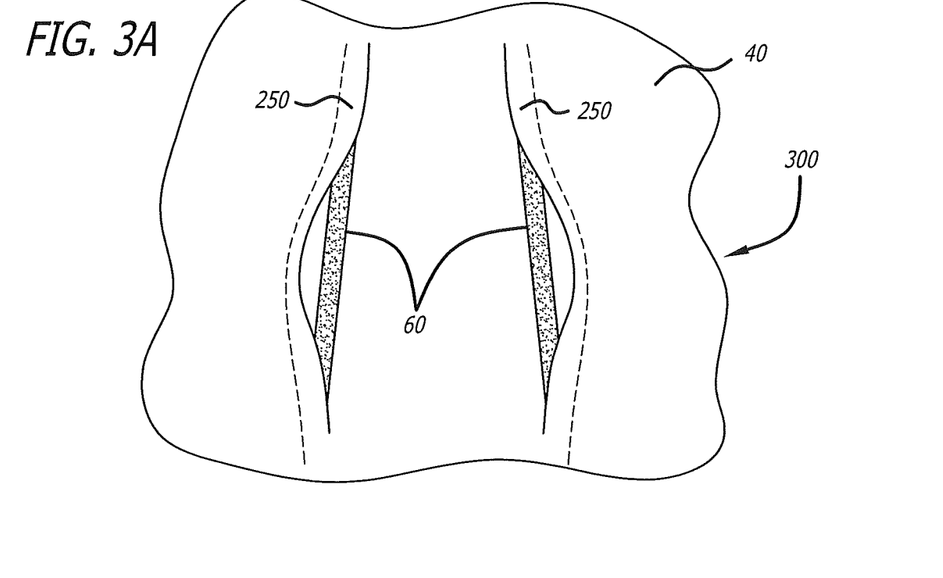
FIG. 3A shows a detailed plan view of hook and loop fasteners disposed on an exemplary embodiment of a child car seat cover embodying teachings of the present disclosure.

Referring now to FIG. 3A which shows a detailed front plan view of one embodiment of a child car seat cover 300 embodying teachings of the present disclosure. As shown in FIG. 3A, the hook and loop fastener 60, one mating half of which lines each opposing side of seat belt openings 250, may be utilized to selectively re-close the seat belt opening 250 once the seat belt 30 has been pulled through the child car seat cover 300. In some embodiments, the seat belt openings 250 may be closed around the seat belts 30 by means of buttons, snaps, hooks, zippers or any of a variety of fastening means well known in the art.

Figure 4:
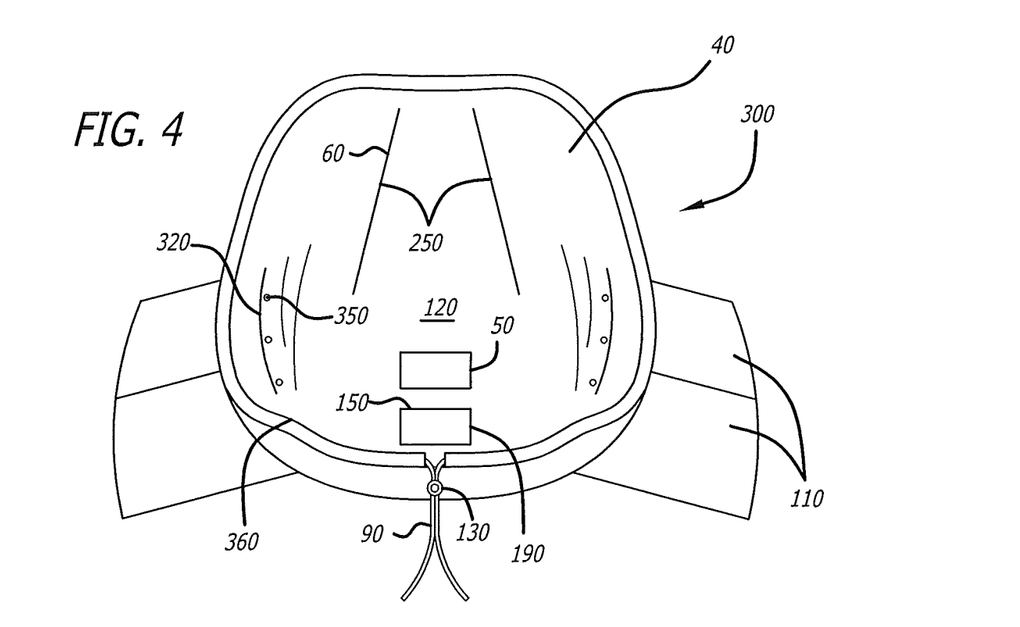
FIG. 4 shows a rear plan view of an exemplary embodiment of a child car seat cover embodying teachings of the present disclosure.

Referring now to FIG. 4 which shows a rear plan view of one embodiment of a child car seat cover 300 embodying teachings of the present disclosure. As shown in FIG. 4, a hook and loop fastener 60 lines both sides of seat belt opening 250. The hook and loop fastener 60 permitting a relatively large opening for easy retrieval of seat belt 30 and also facilitating fast and easy re-closure of said opening to prevent the ingress of contaminants.

With continuing reference to FIG. 4, the simplicity and overall plan of child car seat cover 300 are clearly seen. The entire item may be fabricated out of a single piece of fabric or multiple pieces of fabric with a circumscribing hem on the peripheral edge 100 and various cut and stitched details as follows. In addition to seat belt openings 250, there are several additional openings including a belt fastener opening 50 and a belt adjuster opening 190. In the preferred embodiment, around each of these openings reinforcing fabric 150 is joined to absorbent material 40 by means of stitching. This creates robustly reinforced apertures which will tolerate repeated passage of components through their respective openings without tearing or abrading. In some embodiments, reinforcing fabric 150 may be joined to absorbent material 40 by means of adhesives, ultrasonic welding, or other mechanical or chemical means, or, reinforcing fabric 150 may be omitted entirely. The simplicity of the design and construction of child car seat cover 300 makes it inexpensive to produce and therefore possible to sell at a sufficiently low price as to facilitate the purchase of multiple units. Multiple units permit the user to quickly remove one child car seat cover 300 in the event of a spill or stain and replace it with another so the child 80 is never subjected to a wet or contaminated seating environment. This low price resulting from simple design and construction constitute another benefit of the child car seat cover 300 of the present invention.

The simplicity of the design also permits child car seat 300 to fit universally on substantially any make or model of child car seat and perform all intended functions. This universality of fit constitutes another benefit of the child car seat cover 300 of the present invention.

Still referring to FIG. 4, waterproof lining 120 may be seen fastened by means of stitching to the underside of child car seat cover 300. Waterproof lining 120 has been placed selectively and strategically only in the area of child car seat cover 300 which comprises the seat base when placed over child car seat 10. By this means, liquids which spill on the child car seat cover 300 and which by means of gravity or capillary action migrate to the seat base will not penetrate the absorbent material 40 and wet or contaminate child car seat 10. In some embodiments, waterproof material may be used in other areas of, or throughout, the child car seat cover 300, and may be joined to absorbent material 40 by means of adhesives, ultrasonic welding, or other mechanical or chemical means.

Figure 5:
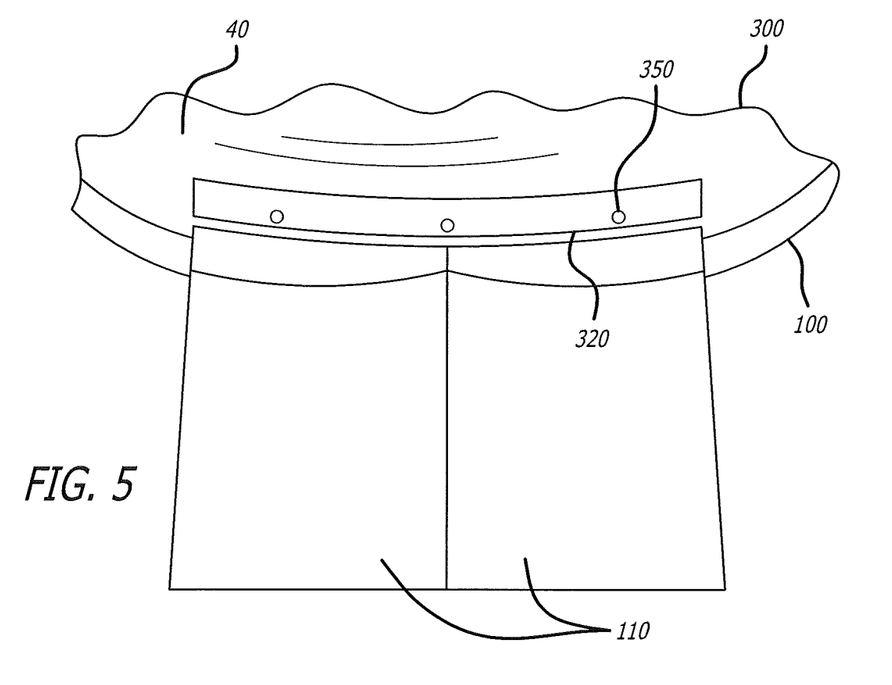
FIG. 5 shows a detail plan view of a pocket disposed on an exemplary embodiment of a child car seat cover embodying teachings of the present disclosure.

Referring now to FIG. 5 which shows a detail plan view of pockets on one embodiment of a child car seat cover 300 embodying teachings of the present disclosure. As shown in FIG. 5, an addition of a small, inexpensive, and easily applied piece of fabric can create one or more pockets 110 on child car seat cover 300. The one or more pockets 110 may hold food, drinks, toys, or baby care accessories as desired, without adding significant cost or complexity to the manufacturing of the product.

In one embodiment, pocket 110 is so sized and positioned on the child car seat cover 300 so as to permit the entirety of the child car seat cover to be rolled or balled up and tucked into the pocket 110. This is advantageous in the event that the child car seat cover 300 has become soiled or contaminated and must be removed from the child car seat 10 and replaced with a clean child car seat cover 300 and the soiled child car seat cover 300 must be stowed until such time as it can be cleaned or laundered. Stowage by this means wherein the child car seat cover 300 is rolled or balled up and tucked into the pocket 110 minimizes the risk of exposure to or contamination by soiled the child car seat cover 300 during transport and stowage.

Figure 6:
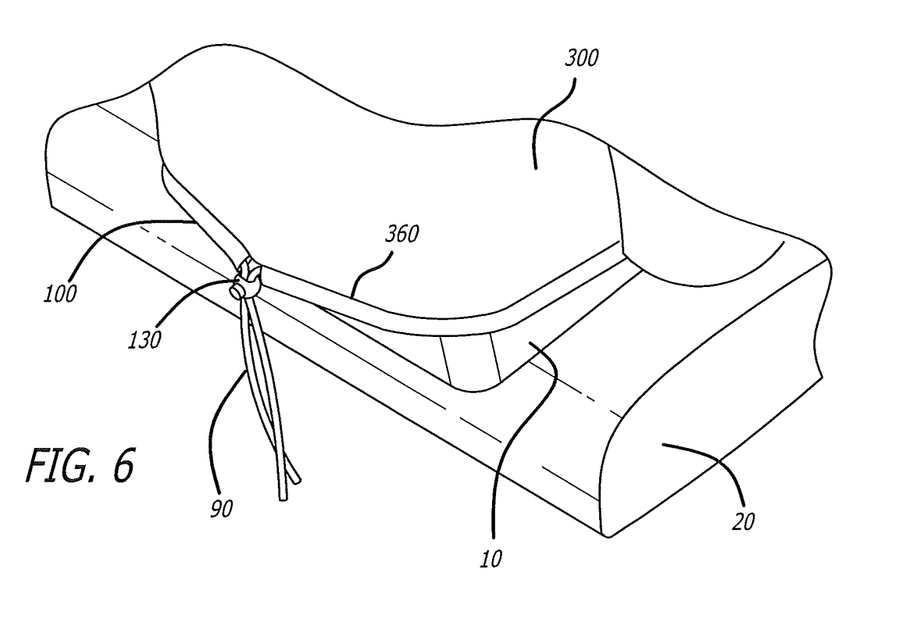
FIG. 6 shows a front perspective view of a drawstring closure comprising an exemplary embodiment of a child car seat cover embodying teachings of the present disclosure.

FIG. 6 is a close up perspective view of a drawstring closure 130. A drawstring 90 may be threaded through the hem of the peripheral edge 100 of all sides of the car seat cover 300 by means of a channel 360 and cinched by way of the drawstring closure 130 in order to reduce the circumference of the peripheral edges 100 of the car seat cover 300. In this way, the car seat cover 300 can be made to fit snugly around almost any size child car seat 10. By fitting securely on all sides of the child car seat 10, the child car seat cover 300 is less likely to cause inconveniences to the child or parent, such as becoming tangled with the child's garments or toys, or inadvertently being moved or pulled by the child 80 or other passengers as they enter or exit the vehicle.

In one embodiment, the peripheral edge 100 of the child car seat cover 300 may be so fastened by means of the drawstring 90 with the drawstring closure 130, said drawstring 90 being captive in a tubular space created by folding the edge of absorbent material 40 over upon itself and securing by stitching or other means to create the channel 360 within which the drawstring 90 resides. In some embodiments, however, any of a variety of methods of tightening the peripheral edges 100 of the car seat cover 300 around the child car seat 10 may be employed, including lengths of elastic around all or portions of the peripheral edge 100, snaps, zippers, hooks, or hook and loop closures placed at different intervals around the peripheral edge 100 which perform the function of cinching together parts of the peripheral edge 100. In some embodiments, opposite ends of straps or cords of elastic material may be securely fastened to diametrically opposed locations of the peripheral edge 100, such as at positions on ventral and/or dorsal surfaces of car seat 10. Thus, the straps or cords may advantageously pull the opposing locations of the peripheral edge 100 towards one another, thereby effectively cinching peripheral edge and securing car seat cover 300 around child car seat 10.

Figure 7:
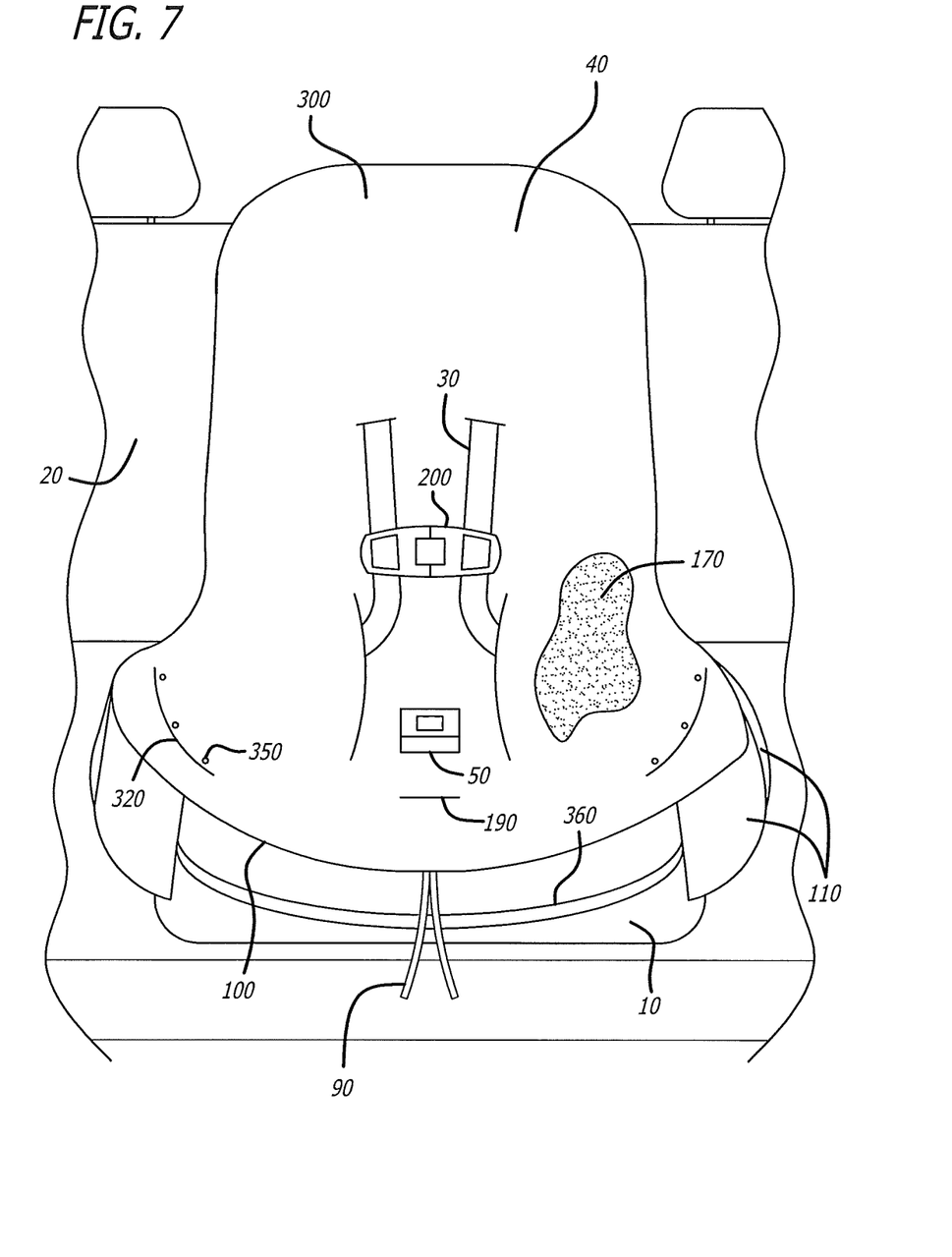
FIG. 7 shows a front perspective view of an exemplary embodiment of a child car seat cover installed on a typical child car seat and soiled by a liquid spill, according to teachings of the present disclosure.

FIG. 7 shows a front perspective view of one embodiment of a child car seat cover 300, embodying teachings of the present disclosure, installed on a typical child car seat 10 and soiled by a liquid spill 170. As shown in FIG. 7, the child car seat cover 300 comprises a protective barrier that has prevented an environmental contaminant in the form of the liquid spill 170 from soiling the child car seat 10. As will be recognized, removing such a contamination from the child car seat 10 would have required difficult, time consuming, and likely incomplete cleaning which may have rendered child car seat 10 unusable for a period of time as it dried from liquids used in the cleaning process. In the instance where the child car seat cover 300 has been soiled, such as due to the liquid spill 170, it is a simple matter to remove the soiled child car seat cover 300 from the child car seat 10 and install a clean child car seat cover 300, thereby immediately restoring a safe, clean, dry, and hygienic car seating environment to the child. The soiled child car seat cover 300 may be stowed and easily laundered at a later time. The protection provided by the child car seat cover 300 against liquids of all kinds, including bodily fluids, is particularly beneficial to families that are traveling with carsick children or potty training children and constitutes another benefit of the child car seat cover 300 of the present invention.

Figure 8:
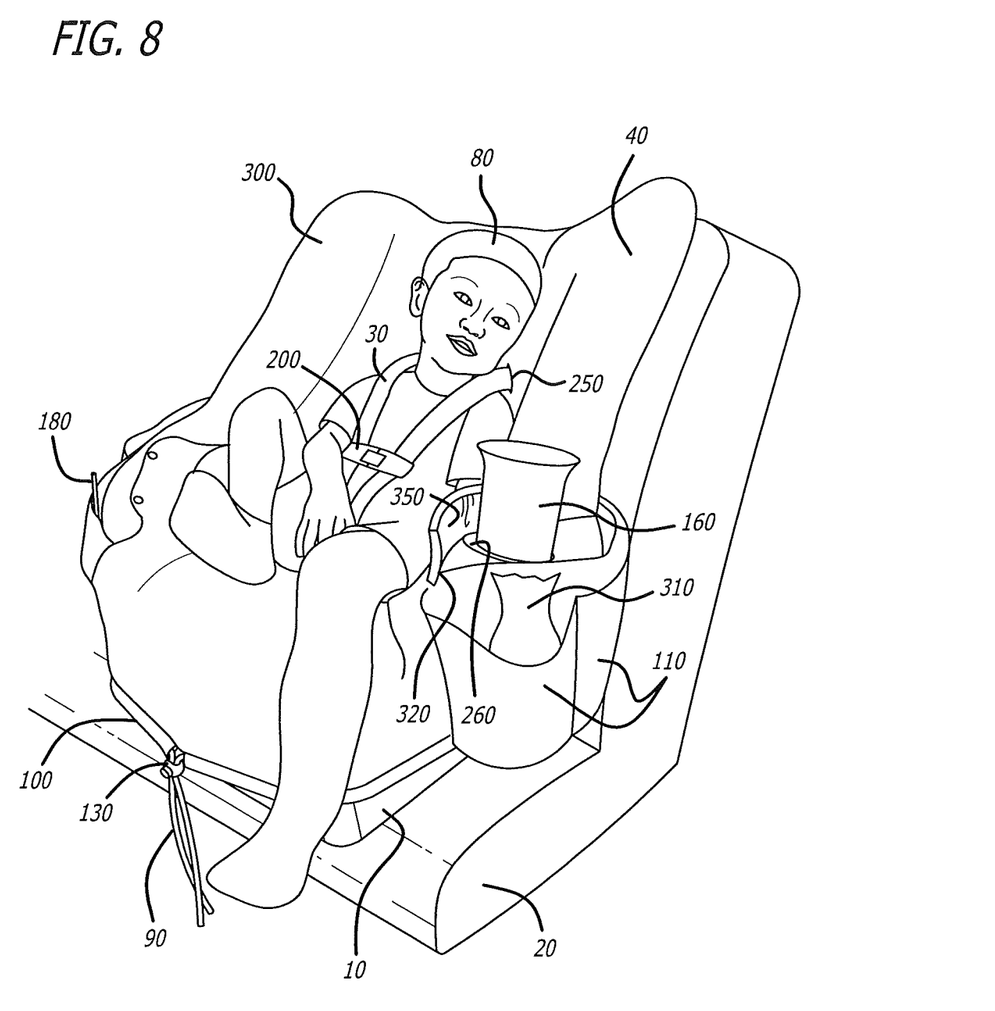
FIG. 8 shows a front perspective view of a child sitting on an exemplary embodiment of a child car seat cover installed on a typical child car seat with the pockets holding several items, according to teachings of the present disclosure.

FIG. 8 shows a front perspective view of the child 80 sitting on an exemplary embodiment of the child car seat cover 300 installed onto a typical child car seat 10 and embodying teachings of the present disclosure. The child car seat cover 300 is comprised of the pockets 110, shown holding several items, and a cup holder opening 320 configured to allowed easy access to drinking vessel 160 and other items that the child 80 may put into a cup holder 260. Further, FIG. 8 demonstrates how the pockets 110 may serve to advantageously hold convenience items such as crackers 310 as well as messy items such as a lollypop 180. The mess normally associated with a partially-eaten lollypop 180 might otherwise be a cause of concern, but when conveniently stowed in the pocket 110 of the child car seat cover 300, the partially-eaten lollypop 180 is prevented from contaminating the child 80, the child car seat 10, and any other nearby surface, including vehicle upholstery. Upon being removed from the child car seat 10, the soiled child car seat 300 may be laundered for future use.

Figure 9:
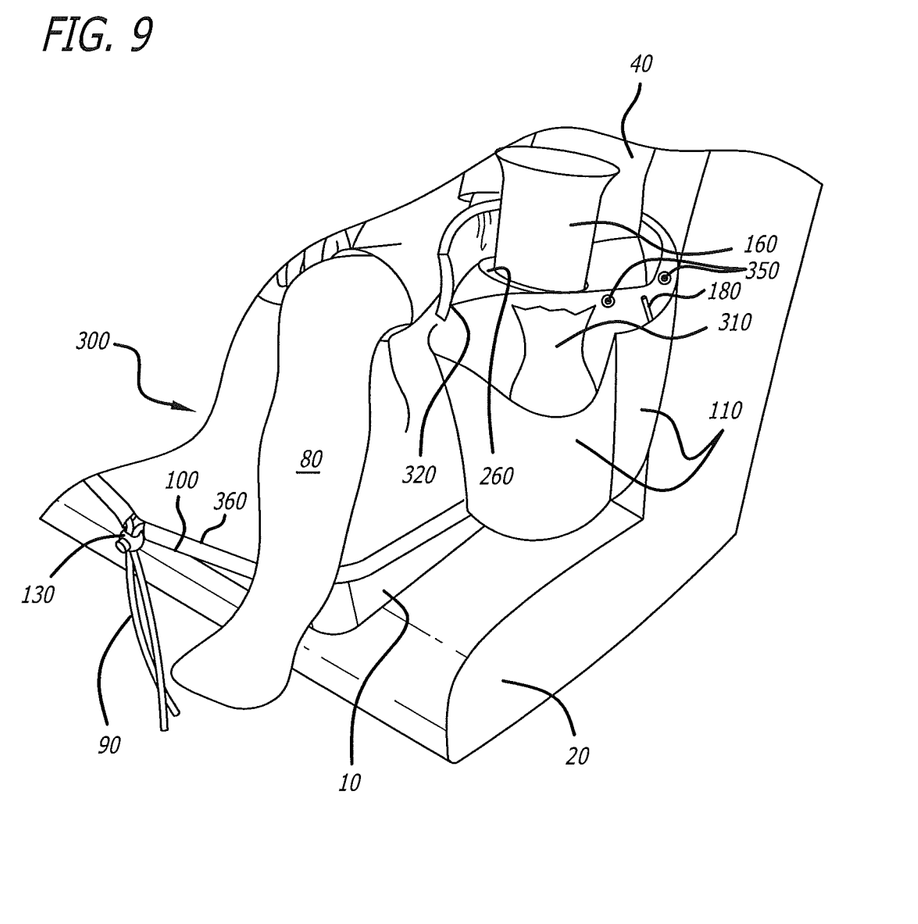
FIG. 9 shows a side perspective view of pockets comprising an exemplary embodiment of a child car seat cover embodying teachings of the present disclosure.

FIG. 9 shows a side perspective view of the child 80 sitting on an exemplary embodiment of the child car seat cover 300 installed onto a typical child car seat 10 and embodying teachings of the present disclosure. As shown in FIG. 8, the cup holder opening 320 allows for easy access to a drinking vessel 160 and other items that the child 80 may put into the cup holder 260. The pockets 110 serve advantageously to hold convenience items such as crackers 310 or messy items such as the partially-eaten lollypop 180. Additionally, the child car seat cover 300 may include one or more cup holder openings 320 disposed in the absorbent material 40 portion of the child car seat cover 300. In some instances, wherein the child car seat 10 is not equipped with cup holders 260, the cup holder openings 320 may be secured by means of snaps 350, hook and loop fasteners 60, buttons, hooks, zippers, or any of a variety of fastening means that are well known in the art. Alternately, when the child car seat cover 300 is utilized with a child car seat 10 that is equipped with cup holders 260, the cup holder openings 320 may be unfastened to provide access to the cup holders 260. Thus, the child car seat cover 300 may be advantageously adapted to child car seats 10 with or without cup holders 260. As will be appreciated, providing access to the cup holders 260 advantageously allows the child 80 to access one of the most convenient, mess-preventing features of the child car seat 10. Other commercially available car seat covers generally block the cup holders 260, thereby preventing their use and limiting the full utility and convenience of the child car seat 10.

In broad embodiment, the present invention is a hygienic, inexpensive, fast and easy to utilize, universal child car seat cover which prevents soiling and contamination of child car seats which may be quickly and easily removed and washed, which is inexpensive enough to facilitate the purchase of multiple units to permit rapid changes, and which does not require special tools or skills to install or remove, with the safety, convenience and functional features disclosed herein.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A cover for installation onto a child car seat comprising: an absorbent material that envelopes all surfaces of a child car seat except seat belt and seat belt hardware openings, the base, underside and back of said car seat;

said cover is capacious and simply designed whereby it can be easily fit on substantially any make or model of child car seat and perform all intended functions;

said cover is hygienic, washable, reusable, and contains no parts that need to be routinely replaced or disposed of;

said material is supple and soft whereby installation and removal of said cover can be easily done on substantially any make or model of child car seat;

said cover comprises a protective surface to receive a seated child whereby all of a child's skin except that exposed by seat belt and seat belt hardware openings and below the calf of the child's legs is prevented from directly contacting said child car seat thus insulating the child against the temperature of said child car seat and potentially uncomfortable surfaces;

said cover comprises a physical barrier whereby all surfaces of said child car seat except for seat belt and seat belt hardware openings, and said child car seat base and back are protected from spills, stains, soiling, and other sources of contamination;

one or more side pockets; said pockets being large enough and said cover compactable enough to be packed into said side pockets;

one or more cup holder openings located to facilitate access to cup holders that may be built into the child car seat;

said cup holder openings being closeable by way of snaps, buttons, zippers, hook and loop fasteners, and the like;

said cover having openings through which seat belts, seat harnesses, adjusters and buckles for same built into said child car seat can be quickly and easily accessed;

said openings for seat belts, seat harnesses, associated adjusters and buckles each have robustly reinforcing fabric joined to the absorbent material by means of stitching or other means whereby repeated passage of components through said openings will be tolerated without tearing or abrading;

a waterproof liner selectively and strategically placed below and between a seated child's posterior and said child car seat;

said liner being joined to said material by means of adhesive, ultrasonic welding or other means.

\* \* \* \* \*